No. 732,716. PATENTED JULY 7, 1903.
J. B. CRETORS.
VEHICLE APRON.
APPLICATION FILED APR. 4, 1903.
NO MODEL. 2 SHEETS—SHEET 1.
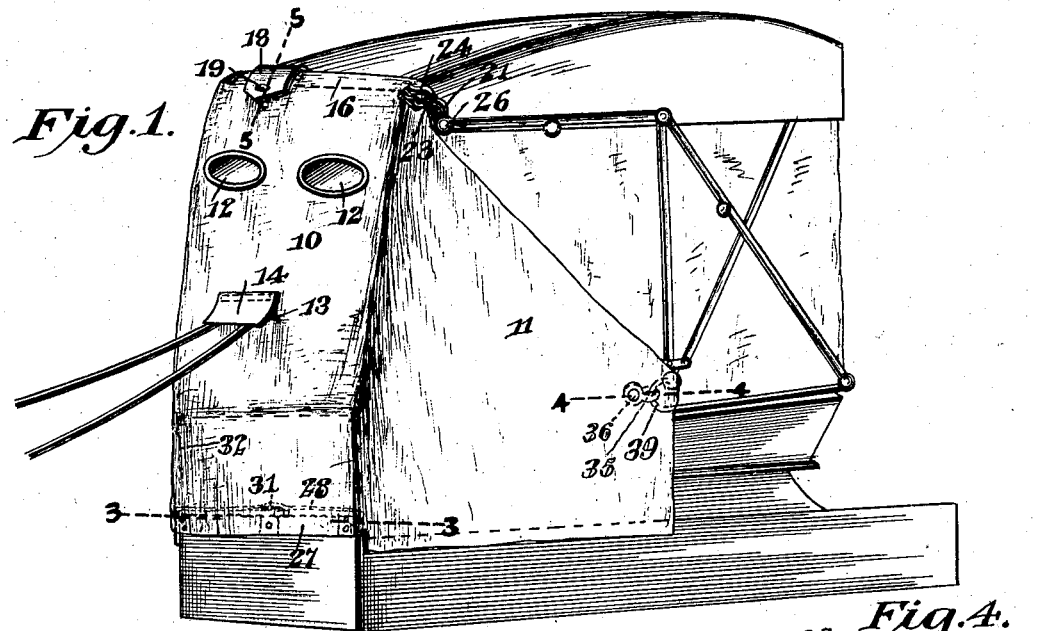
Fig. 1.
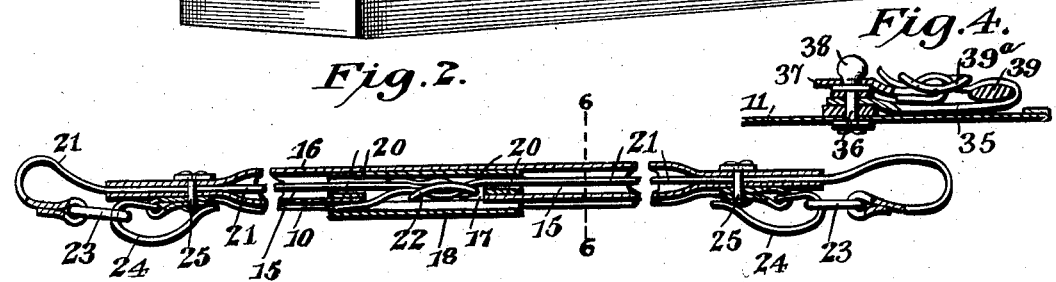
Fig. 2.
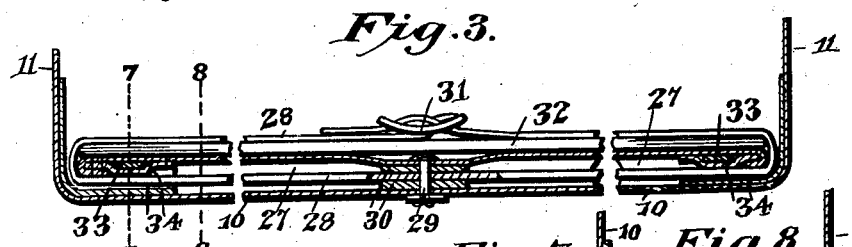
Fig. 3.
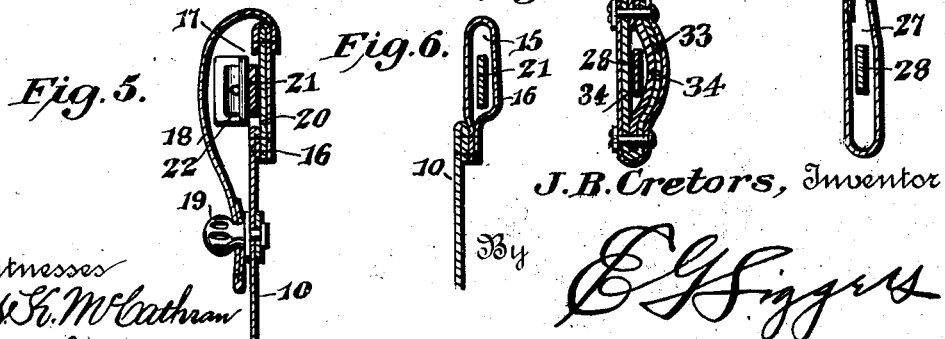
J. B. Cretors, Inventor No. 732,716. PATENTED JULY 7, 1903.
J. B. CRETORS.
VEHICLE APRON.
APPLICATION FILED APR. 4, 1903.
NO MODEL. 2 SHEETS—SHEET 2.

J. B. Cretors, Inventor

Witnesses

No. 732,716. Patented July 7, 1903.

UNITED STATES PATENT OFFICE.

JESSE B. CRETORS, OF ST. PARIS, OHIO, ASSIGNOR OF ONE-HALF TO PETER H. BERRY, OF ST. PARIS, OHIO.

VEHICLE-APRON.

SPECIFICATION forming part of Letters Patent No. 732,716, dated July 7, 1903.

Application filed April 4, 1903. Serial No. 151,137. (No model.)

*To all whom it may concern:*

Be it known that I, JESSE B. CRETORS, a citizen of the United States, residing at St. Paris, in the county of Champaign and State of Ohio, have invented a new and useful Vehicle Apron or Hood, of which the following is a specification.

This invention relates more particularly to the means for securing aprons or hoods to vehicles.

It is the object to provide means of this character which is carried by the apron or hood and is adjustable, so that said apron or hood may be readily applied to tops of different sizes and makes and will fit snugly upon the same to the exclusion of rain, mud, and dust. Furthermore, this means is simple, easily constructed, and being attached to the apron is always in proper position when the cover is applied to a vehicle. Moreover, it is not liable to become detached and lost.

It is also the object to provide novel means of an efficient character for attaching a storm-hood to the dashboard and other portions of a vehicle.

Two forms of the invention are illustrated in the accompanying drawings.

Figure 9:
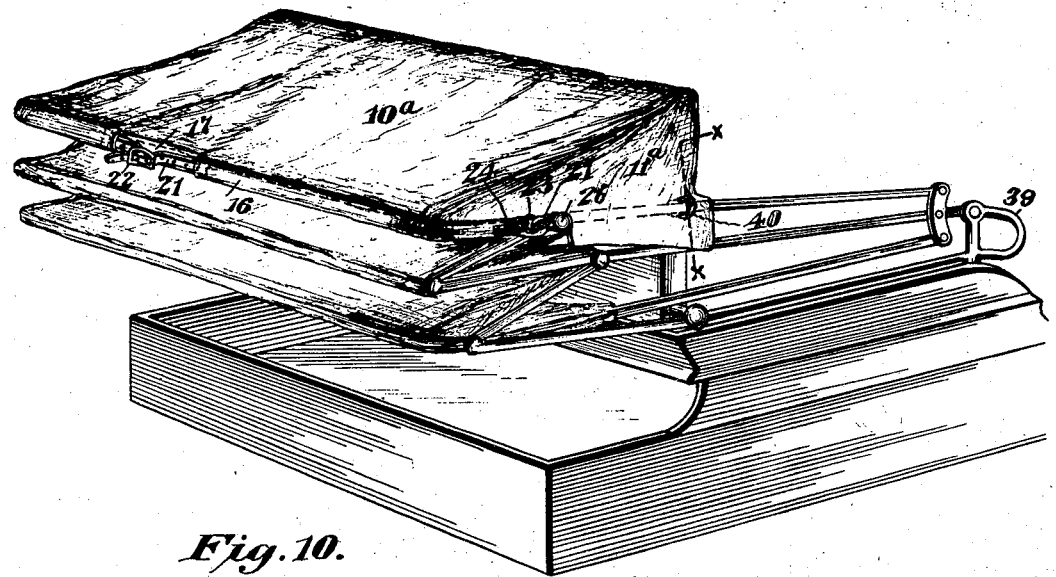
Figure 10:
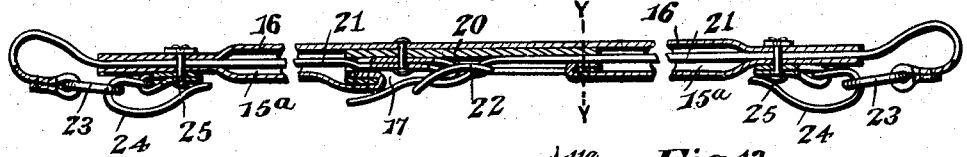
Figures 11, 12, 13:
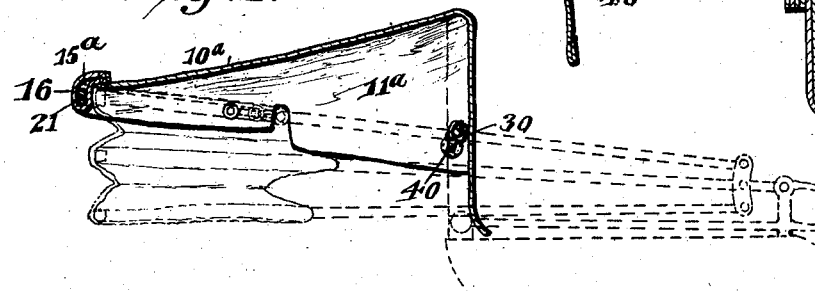

Figure 1 is a perspective view of one embodiment—namely, a storm apron or hood—
showing the same applied to a vehicle. Fig. 2 is a longitudinal sectional view through the securing means for the upper edge of the same. Fig. 3 is a horizontal sectional view taken on the line 3 3 of Fig. 1 and illustrating the means for attaching the apron to a dashboard. Fig. 4 is a detail sectional view taken on the line 4 4 of Fig. 1 and illustrating the means for attaching the side wings of the apron. Fig. 5 is a sectional view taken on the line 5 5 of Fig. 1. Fig. 6 is a detail sectional view on the line 6 6 of Fig. 2. Figs. 7 and 8 are detail sectional views taken, respectively, on the lines 7 7 and 8 8 of Fig. 3. Fig. 9 is a perspective view showing a slightly-modified form of construction—namely, a dust-excluder for vehicle-tops. Fig. 10 is a sectional view through one edge of the same. Fig. 11 is a vertical sectional view through the structure. Fig. 12 is a detail sectional view taken on the line x x of Fig. 9, and Fig. 13 is a sectional view taken on the line y y of Fig. 10.

Similar reference-numerals indicate corresponding parts in all the figures of the drawings.

Before proceeding with the description of the invention it is desired to state that the term "apron" is intended to be broad enough to include dust and storm hoods and covers of various descriptions employed upon vehicles.

The embodiment illustrated in the first eight figures is a storm-hood designed to be applied to the open front of a carriage or buggy, as illustrated in Fig. 1. This hood comprises the apron 10, of sufficient length to extend from the top to the lower portion of the dashboard and having side wings 11, the rear edges of which can be secured to the goosenecks of the seat-arms. The apron is provided with suitable windows or sight-openings 12 and also an opening 13 for the passage of the reins, said latter opening having a suitable flap-cover 14. The upper edge of the apron has a longitudinally-disposed pocket 15, formed by doubling a suitable piece of material 16 and sewing the edges thereof together and to the upper edge of the apron, as illustrated in Fig. 6. This pocket is provided with an intermediate opening 17, normally covered by a flap 18, which is provided at its free end with a suitable fastener 19. The portion of the pocket adjacent to the opening is strengthened by a reinforcing-piece 20. Extending longitudinally through the pocket is a tension-strap comprising sections 21, adjustably connected at their inner ends by a buckle 22, that is located at the opening 17 of said pocket, as illustrated in Figs. 2 and 5. The outer ends of the strap-sections project beyond the ends of the pocket and carry rings 23, which are arranged to detachably engage hooks 24, secured to the apron contiguous to its side edges by means of suitable rivets 25, which pass through the pocket and preferably through the strap-sections to secure them against movement.

The manner of attaching the upper edge of the hood or apron to a vehicle-top will be clearly understood by reference to Figs. 1 and

2. The projecting ends of the tension-strap are looped about the opposite front studs 26, and the rings are engaged upon the hooks 24. Thus the loops formed by the ends of the strap constitute simple attaching devices. The upper edge of the apron is then placed upon the front of the top and is drawn taut by adjusting the buckle connection between the inner ends of the strap-sections, after which the flap 18 is arranged over the intermediate opening of the pocket, thus covering the buckle and excluding all moisture and dirt therefrom. The lower front edge of the apron is also provided with a longitudinally-disposed pocket 27. (Illustrated particularly in Figs. 3, 7, and 8.) This pocket is preferably arranged upon the inner side of the apron and terminates short of the edges thereof. A strap 28 is passed longitudinally through the pocket and is fastened at its central portion within the same by a rivet 29, which also passes through a reinforcing-strip 30. The ends of the strap are provided with a buckle connection 31, and said strap may be passed entirely around the dashboard, (designated 32,) so that the lower edge of the hood or apron can be securely fastened thereto. The edges of the pocket are stiffened by metallic reinforcing-strips 33, (illustrated in Figs. 3 and 7,) said strips being preferably covered by patches 34. It will be evident that this connection constitutes very efficient means for strapping the lower edge of the apron to the dashboard and being secured thereto cannot become detached and lost. The means for fastening the free ends of the side wings 11 is illustrated in Fig. 5. It will be observed that a strap 35 is employed, one end of which is fastened to a post 36, the other end 37 being arranged to detachably engage over a head 38, formed on the post. This strap is designed to be passed around the gooseneck 39 of the side rail, and it is preferably composed of sections connected by a buckle 39ª, which permits its extension or contraction, so that the hood may be accommodated to different sizes and makes of vehicle-tops.

It will be observed that a hood as thus constructed is very durable. The parts are all adjustable with relation to each other and are carried by the apron. The said hood can thus be quickly attached to any top and may be strapped tightly upon the same, so as to form close joints that will exclude moisture, mud, and dust. Moreover, the elements are housed and forming a part of an integral structure will always be in proper position when the same is applied to the vehicle.

In order to show how certain features may be applied to different styles of covers, an apron for excluding dust from the interior of buggy-tops is illustrated in Figs. 9 to 13. The top portion is designated 10ª, and the rear edge of the same is provided with a pocket 15ª similar in all respects to that originally described. The tension-strap, the attaching means formed by the ends thereof, and all the details of construction are exactly the same as those already described, the same reference-numerals being employed. This means is employed for securing the rear edge to the front bow of the top, as in the previously-described embodiment. The body is extended over the rear edge of the seat, and said body is provided with side flaps, which depend over the sides of the top. These flaps are secured by suitable straps 40, (indicated in Fig. 9 and shown in Fig. 12,) said straps being adapted to surround one of the lowered bows.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a structure of the class described, the combination with an apron having an inclosed pocket provided with an intermediate opening, of a tension-strap arranged longitudinally within the pocket and having an adjustable connection located at the opening, and attaching devices arranged at the ends of the pocket.

2. In a structure of the class described, the combination with an apron, of strap-sections carried by the apron, an exposed buckle adjustably connecting the inner portions of the sections, and attaching devices arranged at the outer ends of the strap-sections.

3. In a structure of the class described, the combination with an apron, of strap-sections fastened at their outer ends to the apron contiguous to its edges, a buckle adjustably connecting the inner portions of the sections forming a continuous non-elastic strap, and attaching devices arranged at the outer ends of the strap-sections.

4. In a structure of the class described, the combination with an apron, of spaced attaching-loops carried by the apron, one of said loops having a detachable connection at one end with the apron, and means for contracting the apron between the loops.

5. In a structure of the class described, the combination with an apron, of a flexible attaching-loop secured at one end to the apron, and a detachable connection between the other end of the loop and said apron.

6. In a structure of the class described, the combination with an apron, of a flexible attaching-loop secured at one end to the apron, and having a ring at its other free end, and a hook carried by the apron and arranged to be engaged by the ring.

7. In a structure of the class described, the combination with an apron, of a strap having an intermediate portion secured to the apron, said strap having free ends and means for securing the ends of the strap to the apron to form said ends into attaching-loops.

8. In a structure of the class described, the combination with an apron having a pocket at one edge, of a strap located within the pocket and having an end projecting therefrom, and means for securing the end to the apron to form said end into an attaching-loop.

9. In a structure of the class described, the combination with an apron having a pocket at one edge, said pocket being provided with an intermediate opening, of a strap located within the pocket, and having a buckle arranged at the opening, and means for attaching the ends of the strap to a vehicle.

10. In a structure of the class described, the combination with an apron having a pocket that terminates short of the edges of the apron and has its ends opening on the inner face of the same, and a strap passed through the pocket and arranged to surround the dashboard of a vehicle.

11. In a structure of the class described, the combination with an apron having a pocket, of reinforcing-straps extending across the mouths of the pocket, and a strap secured within the pocket and projecting from the ends thereof.

12. In a structure of the class described, the combination with an apron, of an attaching-strap secured at one end to the apron, and having a detachable connection at its other end with said apron, and a buckle interposed in the strap.

13. In a structure of the class described, the combination with an apron, of strap-sections secured at intermediate points thereto, means for securing the outer ends of the sections to the apron to form attaching-loops, and an adjustable connection between the inner ends of the sections.

14. In a structure of the class described, the combination with an apron having a pocket provided with an intermediate opening, of strap-sections secured in the pocket and having their inner ends located at the opening, an adjustable connection between the inner ends, and means for forming the outer ends into attaching-loops.

In testimony that I claim the foregoing as my own I have hereto affixed my signature in the presence of two witnesses.

JESSE B. CRETORS.

Witnesses:
 FRANK BERRY,
 ALVA C. BOLINGER.